US012709517B2

(12) United States Patent
Roberts et al.

(10) Patent No.: US 12,709,517 B2
(45) Date of Patent: Aug. 18, 2026

(54) BEAM CLIMBER FRICTION MONITORING SYSTEM

(71) Applicant: Otis Elevator Company, Farmington, CT (US)

(72) Inventors: Randy Roberts, Hebron, CT (US); Edward Piedra, Chicopee, MA (US); Sam Thieu Wong, Bridgeport, CT (US); Brad Guilani, Woodstock Valley, CT (US); Don Eager, Milford, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1784 days.

(21) Appl. No.: 16/944,752

(22) Filed: Jul. 31, 2020

(65) Prior Publication Data

US 2022/0033218 A1 Feb. 3, 2022

(51) Int. Cl.

| | |
|---|---|
| ***B66B 5/00*** | (2006.01) |
| ***B66B 5/06*** | (2006.01) |
| ***B66B 9/02*** | (2006.01) |
| ***B66B 11/00*** | (2006.01) |

(52) U.S. Cl.

CPC .............. *B66B 5/0031* (2013.01); *B66B 5/06* (2013.01); *B66B 9/02* (2013.01); *B66B 11/005* (2013.01)

(58) Field of Classification Search

CPC ......... B66B 1/24; B66B 1/28–30; B66B 1/34; B66B 1/3415; B66B 1/3423; B66B 1/3446–3461; B66B 5/00; B66B 5/0006; B66B 5/0018–0037; B66B 5/02; B66B 5/04; B66B 5/06; B66B 9/02; B66B 11/005; B66B 11/028; B66B 11/0286; B66B 11/04; B66B 11/043

See application file for complete search history.

(56) References Cited

U.S. PATENT DOCUMENTS

| | | | | |
|---|---|---|---|---|
| 5,566,784 | A | 10/1996 | Rennetaud | |
| 6,626,267 | B2 * | 9/2003 | Beus | B66B 19/06 187/290 |
| 8,261,886 | B2 * | 9/2012 | Kigawa | B66B 5/00 187/393 |
| 10,124,991 | B2 * | 11/2018 | Valjus | B66B 5/048 |
| 2019/0077636 | A1 * | 3/2019 | Bhaskar | B66B 9/003 |
| 2022/0380179 | A1 * | 12/2022 | Hutchinson | B66B 9/02 |

FOREIGN PATENT DOCUMENTS

| | | |
|---|---|---|
| JP | 5492949 B2 | 5/2014 |

* cited by examiner

*Primary Examiner* — Christopher Uhlir

(74) *Attorney, Agent, or Firm* — CANTOR COLBURN LLP

(57) ABSTRACT

An elevator system including: an elevator car configured to travel through an elevator shaft; a first guide beam extending vertically through the elevator shaft, the first guide beam including a first surface and a second surface opposite the first surface; a beam climber system configured to move the elevator car through the elevator shaft, the beam climber system including: a first wheel in contact with the first surface; and a first electric motor configured to rotate the first wheel; and a controller configured to determine wheel slippage in a low friction area along the first guide beam.

17 Claims, 3 Drawing Sheets

BEAM CLIMBER FRICTION MONITORING SYSTEM

BACKGROUND

The subject matter disclosed herein relates generally to the field of elevator systems, and specifically to a method and apparatus for detecting loss of friction on a propulsion system for an elevator car.

Elevator cars are conventionally operated by ropes and counter weights, which typically only allow one elevator car in an elevator shaft at a single time.

BRIEF SUMMARY

According to an embodiment, an elevator system is provided. The elevator system including: an elevator car configured to travel through an elevator shaft; a first guide beam extending vertically through the elevator shaft, the first guide beam including a first surface and a second surface opposite the first surface; a beam climber system configured to move the elevator car through the elevator shaft, the beam climber system including: a first wheel in contact with the first surface; and a first electric motor configured to rotate the first wheel; and a controller configured to determine wheel slippage in a low friction area along the first guide beam.

In addition to one or more of the features described herein, or as an alternative, further embodiments may include a sensor configured to detect a rotational wheel speed of the first wheel, wherein the controller is configured to determine wheel slippage when the rotational wheel speed is outside of a rotational wheel speed tolerance range.

In addition to one or more of the features described herein, or as an alternative, further embodiments may include an accelerometer configured to detect a speed of the elevator car or the beam climber system, wherein the controller is configured to determine wheel slippage when the speed is greater than an expected speed.

In addition to one or more of the features described herein, or as an alternative, further embodiments may include a sensor configured to detect a torque of the first electric motor, wherein the controller is configured to determine wheel slippage when the torque is outside of a torque tolerance range.

In addition to one or more of the features described herein, or as an alternative, further embodiments may include a sensor configured to detect a rotational wheel speed of the first wheel; and a sensor configured to detect a torque of the first electric motor, wherein the controller is configured to determine wheel slippage when the rotational wheel speed is outside of a rotational wheel speed tolerance range and the torque is outside of a torque tolerance range.

In addition to one or more of the features described herein, or as an alternative, further embodiments may include a position reference system configured to detect a location of the elevator car when the wheel slippage is detected.

In addition to one or more of the features described herein, or as an alternative, further embodiments may include a first motor brake mechanically connected to the first electric motor, wherein the controller is configured to activate the first motor brake when the first wheel is at or proximate the low friction area.

In addition to one or more of the features described herein, or as an alternative, further embodiments may include that the controller is configured to pulsate the first motor brake when the first wheel is at or proximate the low friction area.

In addition to one or more of the features described herein, or as an alternative, further embodiments may include a first guide rail extending vertically through the elevator shaft; and a first guide rail brake operably connected to the first guide rail, wherein the controller is configured to activate the first guide rail brake when the first wheel is at or proximate the low friction area.

In addition to one or more of the features described herein, or as an alternative, further embodiments may include a first guide rail extending vertically through the elevator shaft; and a first guide rail brake operably connected to the first guide rail, wherein the controller is configured to pulsate the first guide rail brake when the first wheel is at or proximate the low friction area.

In addition to one or more of the features described herein, or as an alternative, further embodiments may include a compression mechanism, configured to compress the first wheel against the first surface of the guide beam.

In addition to one or more of the features described herein, or as an alternative, further embodiments may include that the controller is configured to increase compression of the first wheel against the first surface of the guide beam when the first wheel is at or proximate the low friction area.

According to another embodiment, a method of operating an elevator system is provided. The method including: rotating, using a first electric motor of a beam climber system, a first wheel, the first wheel being in contact with a first surface of a first guide beam that extends vertically through an elevator shaft; moving, using the beam climber system, an elevator car through the elevator shaft when the first wheel of the beam climber system rotates along the first surface of the first guide beam; and determining, using a controller, wheel slippage in a low friction area along the first guide beam.

In addition to one or more of the features described herein, or as an alternative, further embodiments may include detecting, using a sensor, a rotational wheel speed of the first wheel, wherein the controller is configured to determine wheel slippage when the rotational wheel speed is outside of a rotational wheel speed tolerance range.

In addition to one or more of the features described herein, or as an alternative, further embodiments may include detecting, using an accelerometer, a speed of the elevator car or the beam climber system, wherein the controller is configured to determine wheel slippage when the speed is greater than an expected speed.

In addition to one or more of the features described herein, or as an alternative, further embodiments may include detecting, using a sensor, a torque of the first electric motor, wherein the controller is configured to determine wheel slippage when the torque is outside of a torque tolerance range.

In addition to one or more of the features described herein, or as an alternative, further embodiments may include detecting, using a sensor, a rotational wheel speed of the first wheel; and detecting, using a sensor, a torque of the first electric motor, wherein the controller is configured to determine wheel slippage when the rotational wheel speed is outside of a rotational wheel speed tolerance range and the torque is outside of a torque tolerance range.

In addition to one or more of the features described herein, or as an alternative, further embodiments may include activating, using the controller, a first motor brake when the first wheel is at or proximate the low friction area, the first motor brake being mechanically connected to the first electric motor.

In addition to one or more of the features described herein, or as an alternative, further embodiments may include activating, using the controller, a first guide rail brake when the first wheel is at or proximate the low friction area, the first guide rail brake being operably connected to a first guide rail that extends vertically through the elevator shaft.

In addition to one or more of the features described herein, or as an alternative, further embodiments may include compressing, using a compression mechanism, the first wheel against the first surface of the first guide beam.

Technical effects of embodiments of the present disclosure include detecting wheel slippage of a beam climber system through an increasing, rotational wheel speed, decreasing torque, and a variance in speed detections.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
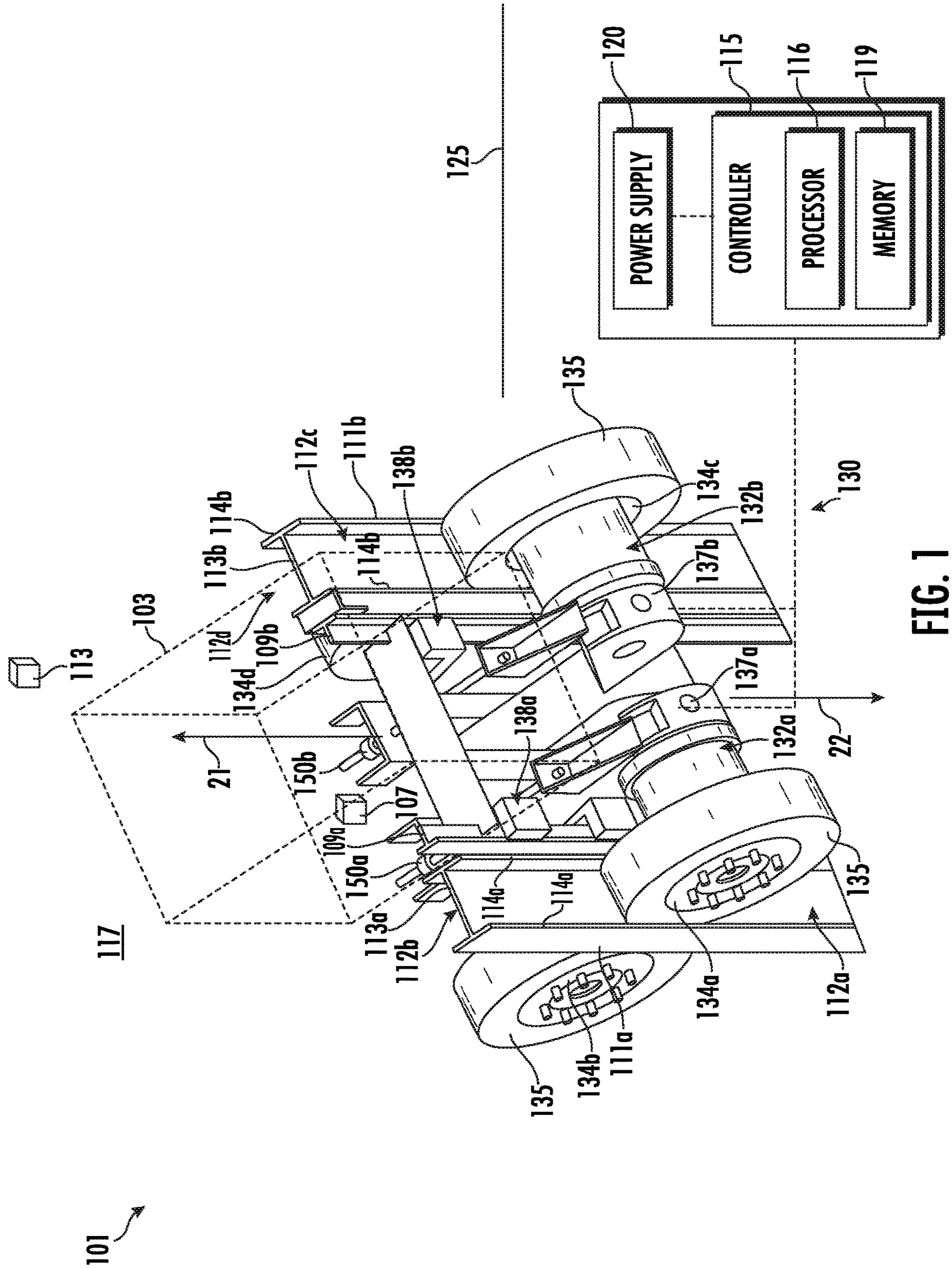
FIG. 1 is a schematic illustration of an elevator system with a beam climber system, in accordance with an embodiment of the disclosure

FIG. 1 is a perspective view of an elevator system 101 including an elevator car 103, a beam climber system 130, a controller 115, and a power source 120. Although illustrated in FIG. 1 as separate from the beam climber system 130, the embodiments described herein may be applicable to a controller 115 included in the beam climber system 130 (i.e., moving through an elevator shaft 117 with the beam climber system 130) and may also be applicable to a controller located off of the beam climber system 130 (i.e., remotely connected to the beam climber system 130 and stationary relative to the beam climber system 130). Although illustrated in FIG. 1 as separate from the beam climber system 130, the embodiments described herein may be applicable to a power source 120 included in the beam climber system 130 (i.e., moving through the elevator shaft 117 with the beam climber system 130) and may also be applicable to a power source located off of the beam climber system 130 (i.e., remotely connected to the beam climber system 130 and stationary relative to the beam climber system 130).

The beam climber system 130 is configured to move the elevator car 103 within the elevator shaft 117 and along guide rails 109*a*, 109*b* that extend vertically through the elevator shaft 117. In an embodiment, the guide rails 109*a*, 109*b* are T-beams. The beam climber system 130 includes one or more electric motors 132*a*, 132*b*. The electric motors 132*a*, 132*b* are configured to move the beam climber system 130 within the elevator shaft 117 by rotating one or more wheels 134*a*, 134*b* that are pressed against a guide beam 111*a*, 111*b*. In an embodiment, the guide beams 111*a*, 111*b* are I-beams. It is understood that while an I-beam is illustrated, any beam or similar structure may be utilized with the embodiment described herein. Friction between the wheels 134*a*, 134*b*, 134*c*, 134*d* driven by the electric motors 132*a*, 132*b* allows the wheels 134*a*, 134*b*, 134*c*, 134*d* to climb up 21 and down 22 the guide beams 111*a*, 111*b*. The guide beam extends vertically through the elevator shaft 117. It is understood that while two guide beams 111*a*, 111*b* are illustrated, the embodiments disclosed herein may be utilized with one or more guide beams. It is also understood that while two electric motors 132*a*, 132*b* are illustrated, the embodiments disclosed herein may be applicable to beam climber systems 130 having one or more electric motors. For example, the beam climber system 130 may have one electric motor for each of the four wheels 134*a*, 134*b*, 134*c*, 134*d*. The electrical motors 132*a*, 132*b* may be permanent magnet electrical motors, asynchronous motor, or any electrical motor known to one of skill in the art. In other embodiments, not illustrated herein, another configuration could have the powered wheels at two different vertical locations (i.e., at bottom and top of an elevator car 103).

The first guide beam 111*a* includes a web portion 113*a* and two flange portions 114*a*. The web portion 113*a* of the first guide beam 111*a* includes a first surface 112*a* and a second surface 112*b* opposite the first surface 112*a*. A first wheel 134*a* is in contact with the first surface 112*a* and a second wheel 134*b* is in contact with the second surface 112*b*. The first wheel 134*a* may be in contact with the first surface 112*a* through a tire 135 and the second wheel 134*b* may be in contact with the second surface 112*b* through a tire 135. The first wheel 134*a* is compressed against the first surface 112*a* of the first guide beam 111*a* by a first compression mechanism 150*a* and the second wheel 134*b* is compressed against the second surface 112*b* of the first guide beam 111*a* by the first compression mechanism 150*a*. The first compression mechanism 150*a* compresses the first wheel 134*a* and the second wheel 134*b* together to clamp onto the web portion 113*a* of the first guide beam 111*a*. The first compression mechanism 150*a* may be a metallic or elastomeric spring mechanism, a pneumatic mechanism, a hydraulic mechanism, a turnbuckle mechanism, an electromechanical actuator mechanism, a spring system, a hydraulic cylinder, a motorized spring setup, or any other known force actuation method. The first compression mechanism 150*a* may be adjustable in real-time during operation of the elevator system 101 to control compression of the first wheel 134*a* and the second wheel 134*b* on the first guide beam 111*a*. The first wheel 134*a* and the second wheel 134*b* may each include a tire 135 to increase traction with the first guide beam 111*a*.

The first surface 112*a* and the second surface 112*b* extend vertically through the shaft 117, thus creating a track for the first wheel 134*a* and the second wheel 134*b* to ride on. The flange portions 114*a* may work as guardrails to help guide the wheels 134*a*, 134*b* along this track and thus help prevent the wheels 134*a*, 134*b* from running off track.

The first electric motor 132*a* is configured to rotate the first wheel 134*a* to climb up 21 or down 22 the first guide beam 111*a*. The first electric motor 132*a* may also include a first motor brake 137*a* to slow and stop rotation of the first electric motor 132*a*. The first motor brake 137*a* may be mechanically connected to the first electric motor 132*a*. The first motor brake 137*a* may be a clutch system, a disc brake system, a drum brake system, a brake on a rotor of the first electric motor 132*a*, an electronic braking, an Eddy current brakes, a Magnetorheological fluid brake or any other known braking system. The beam climber system 130 may also include a first guide rail brake 138*a* operably connected to the first guide rail 109*a*. The first guide rail brake 138*a* is configured to slow movement of the beam climber system 130 by clamping onto the first guide rail 109*a*. The first guide rail brake 138*a* may be a caliper brake acting on the first guide rail 109*a* on the beam climber system 130, or caliper brakes acting on the first guide rail 109 proximate the elevator car 103.

The second guide beam 111*b* includes a web portion 113*b* and two flange portions 114*b*. The web portion 113*b* of the second guide beam 111*b* includes a first surface 112*c* and a second surface 112*d* opposite the first surface 112*c*. A third wheel 134*c* is in contact with the first surface 112*c* and a fourth wheel 134*d* is in contact with the second surface 112*d*. The third wheel 134*c* may be in contact with the first surface 112*c* through a tire 135 and the fourth wheel 134*d* may be in contact with the second surface 112*d* through a tire 135. A third wheel 134*c* is compressed against the first surface 112*c* of the second guide beam 111*b* by a second compression mechanism 150*b* and a fourth wheel 134*d* is compressed against the second surface 112*d* of the second guide beam 111*b* by the second compression mechanism 150*b*. The second compression mechanism 150*b* compresses the third wheel 134*c* and the fourth wheel 134*d* together to clamp onto the web portion 113*b* of the second guide beam 111*b*. The second compression mechanism 150*b* may be a spring mechanism, turnbuckle mechanism, an actuator mechanism, a spring system, a hydraulic cylinder, and/or a motorized spring setup. The second compression mechanism 150*b* may be adjustable in real-time during operation of the elevator system 101 to control compression of the third wheel 134*c* and the fourth wheel 134*d* on the second guide beam 111*b*. The third wheel 134*c* and the fourth wheel 134*d* may each include a tire 135 to increase traction with the second guide beam 111*b*.

The first surface 112*c* and the second surface 112*d* extend vertically through the shaft 117, thus creating a track for the third wheel 134*c* and the fourth wheel 134*d* to ride on. The flange portions 114*b* may work as guardrails to help guide the wheels 134*c*, 134*d* along this track and thus help prevent the wheels 134*c*, 134*d* from running off track.

The second electric motor 132*b* is configured to rotate the third wheel 134*c* to climb up 21 or down 22 the second guide beam 111*b*. The second electric motor 132*b* may also include a second motor brake 137*b* to slow and stop rotation of the second motor 132*b*. The second motor brake 137*b* may be mechanically connected to the second motor 132*b*. The second motor brake 137*b* may be a clutch system, a disc brake system, drum brake system, a brake on a rotor of the second electric motor 132*b*, an electronic braking, an Eddy current brake, a Magnetorheological fluid brake, or any other known braking system. The beam climber system 130 includes a second guide rail brake 138*b* operably connected to the second guide rail 109*b*. The second guide rail brake 138*b* is configured to slow movement of the beam climber system 130 by clamping onto the second guide rail 109*b*. The second guide rail brake 138*b* may be a caliper brake acting on the first guide rail 109*a* on the beam climber system 130, or caliper brakes acting on the first guide rail 109 proximate the elevator car 103.

The elevator system 101 may also include a position reference system 113. The position reference system 113 may be mounted on a fixed part at the top of the elevator shaft 117, such as on a support or guide rail 109, and may be configured to provide position signals related to a position of the elevator car 103 within the elevator shaft 117. In other embodiments, the position reference system 113 may be directly mounted to a moving component of the elevator system (e.g., the elevator car 103 or the beam climber system 130), or may be located in other positions and/or configurations as known in the art. The position reference system 113 can be any device or mechanism for monitoring a position of an elevator car within the elevator shaft 117, as known in the art. For example, without limitation, the position reference system 113 can be an encoder, sensor, accelerometer, altimeter, pressure sensor, range finder, or other system and can include velocity sensing, absolute position sensing, etc., as will be appreciated by those of skill in the art.

The controller 115 may be an electronic controller including a processor 116 and an associated memory 119 comprising computer-executable instructions that, when executed by the processor 116, cause the processor 116 to perform various operations. The processor 116 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 119 may be but is not limited to a random access memory (RAM), read only memory (ROM), or other electronic, optical, magnetic or any other computer readable medium.

The controller 115 is configured to control the operation of the elevator car 103 and the beam climber system 130. For example, the controller 115 may provide drive signals to the beam climber system 130 to control the acceleration, deceleration, leveling, stopping, etc. of the elevator car 103.

The controller 115 may also be configured to receive position signals from the position reference system 113 or any other desired position reference device.

When moving up 21 or down 22 within the elevator shaft 117 along the guide rails 109*a*, 109*b*, the elevator car 103 may stop at one or more landings 125 as controlled by the controller 115. In one embodiment, the controller 115 may be located remotely or in the cloud. In another embodiment, the controller 115 may be located on the beam climber system 130. In embodiment, the controller 130 controls on-board motion control of the beam climber system 115 (e.g., a supervisory function above the individual motor controllers).

The power supply 120 for the elevator system 101 may be any power source, including a power grid and/or battery power which, in combination with other components, is supplied to the beam climber system 130. In one embodiment, power source 120 may be located on the beam climber system 130. In an embodiment, the power supply 120 is a battery that is included in the beam climber system 130.

The elevator system 101 may also include an accelerometer 107 attached to the elevator car 103 or the beam climber system 130. The accelerometer 107 is configured to detect an acceleration and/or a speed of the elevator car 103 and the beam climber system 130.

Figure 2:
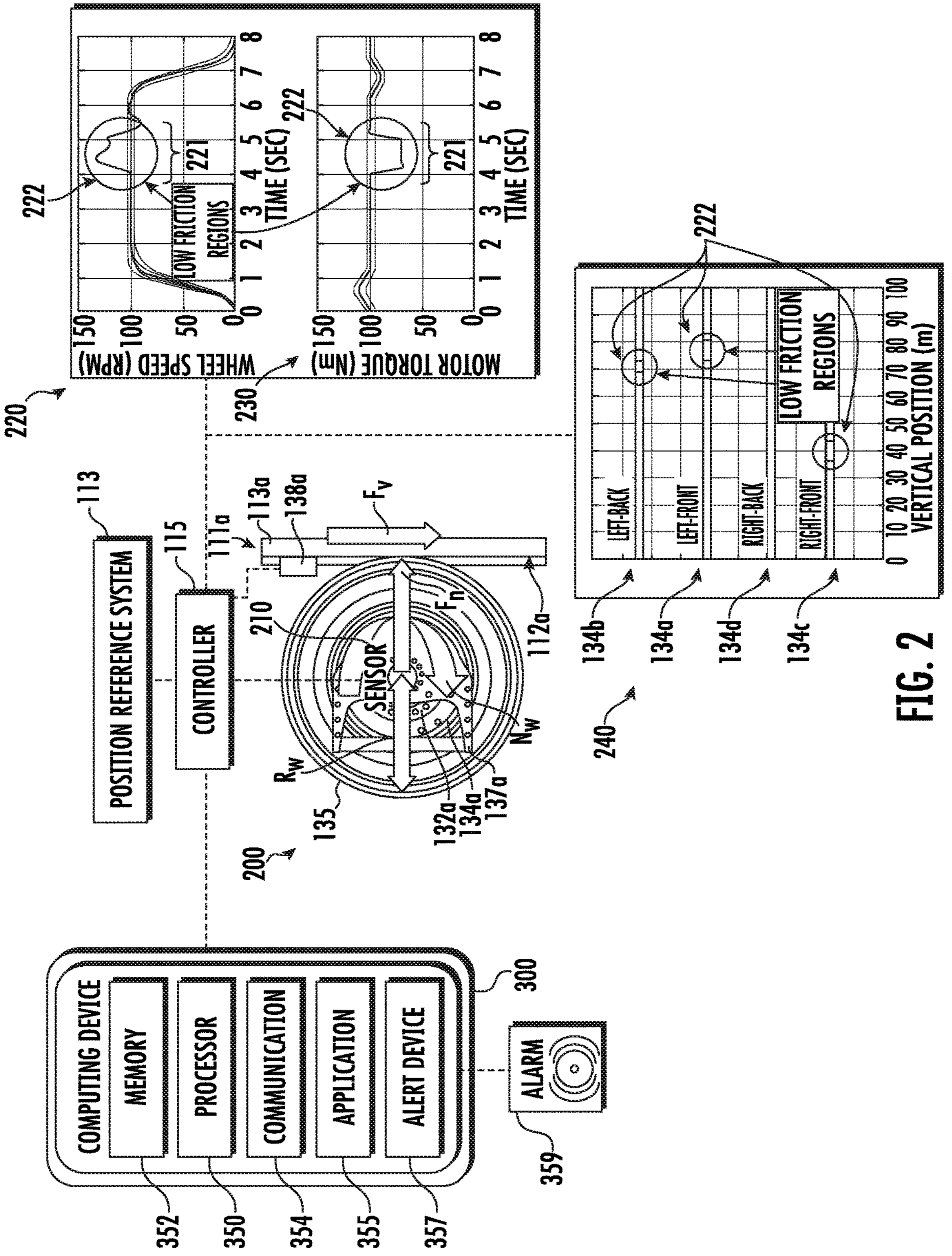
FIG. 2 illustrates a schematic view of a friction monitoring system, in accordance with an embodiment of the disclosure.

Referring now to FIG. 2, with continued reference to FIG. 1, a friction monitoring system 200 is illustrated, in accordance with an embodiment of the present disclosure. The friction monitoring system 200 is configured to monitor the friction between tires 135 of the beam climber system 130 and the guide beams 111*a* and 111*b*. The friction monitoring system 200 is configured to determine when and where slippage may be occurring between the tires 135 and the guide beams 111*a* and 111*b*.

The monitoring system 200 includes a sensor 210 configured to detect rotational wheel speed $N_w$ of the wheels 134*a*, 134*b*, 134*c*, 134*d*, which helps detect wheel slippage and low friction areas 222 along the guide beam 111*a*, 111*b*. A rotational wheel speed $N_w$ outside of a rotation wheel speed tolerance range may indicate wheel slippage. The sensor 210 may be configured to detect rotational wheel speed $N_w$ by detecting electrical power consumption by electric motors 132*a*, 132*b* or physically/mechanically detect rotational speed of the wheels 134*a*, 134*b*, 134*c*, 134*d* or the electric motors 132*a*, 132*b*. Alternatively, the sensor 210 may be a rotary encoder on a motor shaft of the electric motors 132*a*, 132*b*, electromagnetic, or optical sensor.

In one example, if the tire 135 of the first wheel 134*a* is slipping or loosing grip with the first surface 112*a* of the web portion 113*a* of the first guide beam 11*a*, then first electric motor 132*a* will momentarily spin faster at this low friction area 222 as the first wheel 134*a* is slipping, as shown by the rotational wheel speed versus time chart 220 in FIG. 2. The controller 115 is configured to communicate with the position reference system 113 to determine where the elevator car 103 was in the shaft 117 at the time 221 of slippage to determine low friction area 222. This low friction area 222 will be saved in the controller 115 or a connected cloud.

The monitoring system 200 includes a sensor 210 configured to detect motor torque, which helps the controller 115 detect wheel slippage in a low friction area along the guide beam 111*a*, 111*b*. A torque outside of a torque tolerance range may indicate wheel slippage. The torque is a product of the radius of the wheel 134*a*, 134*b*, 134*c*, 134*d*, multiplied by the propulsion thrust $F_V$. The coefficient of friction is equal to the propulsion thrust $F_V$ divided by the normal force $F_N$ of the wheels 134*a*, 134*b*, 134*c*, 134*d*.

The torque may be determined from a motor current of an electric motor 132*a*, 132*b*, which is directly related to the motor torque via a torque constant $K_t$. That is, $R_w F_v = K_t I_m$, where $R_w$ is a radius of the wheel 134*a*, 134*b*, 134*c*, 134*d* and $I_m$ is motor current. Motor torque is approximated by $K_t I_m$. It is noted that $K_t$ may not always be constant and could change with a motor winding temperature, but it may be reasonable to assume it is a constant during a single run so any significant torque variations do indicate slippage.

In one example, if the tire 135 of the first wheel 134*a* is slipping or loosing grip with the first surface 112*a* of the web portion 113*a* of the first guide beam, then first electric motor 132*a* will momentarily spin freely (i.e., lower torque) at this low friction area 222 as the first wheel 134*a* is slipping, as shown by the wheel torque versus time chart 230 in FIG. 2. The controller 115 is configured to communicate with the position reference system 113 to determine where the elevator car 103 was in the shaft 117 at the time 221 of slippage to determine a low friction area 222. This low friction area 222 will be saved in the controller 115.

As indicated by the rotational wheel speed versus time chart 220 and the wheel torque versus time chart 230 in FIG. 2, low friction area 222 can cause deviations in both motor torque and wheel speed. The controller 115 is configured to implement a feedback loop to drive the motor current to keep the motor speed at its desired command, but both may deviate from their expected values.

The controller 115 may generate a low friction area map 240 of the low friction area 222 (e.g., low friction regions) for each of the first wheel 134*a*, the second wheel 134*b*, the third wheel 134*c*, and the fourth wheel 134*d*.

In one embodiment, the low friction area 22 may be detected using only rotational wheel speed $N_w$ or only motor torque. In another embodiment, the low friction area 22 may be detected using both rotational wheel speed $N_w$ and motor torque in combination. For example, rotational wheel speed $N_w$ may be used to double check motor torque or motor torque may be used to double check rotational wheel speed $N_w$.

The controller 115 may be configured to activate an alarm 359 in response to this low friction area 222. The alarm 359 may be an audible and/or visual alert.

The alarm 359 may be activated on a computing device 300. The computing device 300 may be local, remote, or cloud based. The computing device 300 may belong to a mechanic, owner, operator, or maintainer of the elevator system 101. The alarm 359 may indicate that the guide beam 111*a*, 111*b* should be inspected at the location of the low friction area 222. The computing device may be a personal computer, a smart phone, a smart watch, a cellular phone, a laptop computer, a desktop computer, a tablet computer, or similar computing device known to one of skill in the art. The computing device 300 is in electronic communication with the controller 115. The computing device 300 may include a touch screen (not shown), mouse, keyboard, scroll wheel, physical button, or any input mechanism known to one of skill in the art. The computing device 300 may include a processor 350, memory 352 and communication module 354 as shown in FIG. 2. The processor 350 can be any type or combination of computer processors, such as a microprocessor, microcontroller, digital signal processor, application specific integrated circuit, programmable logic device, and/or field programmable gate array. The memory 352 is an example of a non-transitory computer readable storage medium tangibly embodied in the computing device 300 including executable instructions stored therein, for instance, as firmware. The communication module 354 may implement one or more communication protocols, such as, for example, direct communication with controller 115, cellular, Wi-Fi, Bluetooth, Satellite, or similar communication method known to one of skill in the art. Embodiments herein generate a graphical user interface on the computing device 300 through an application 355. The graphical user interface may display at least one of any indication of slippage, the rotational wheel speed versus time chart 220, the wheel toque versus time chart 230, the low friction area map 240, and the low friction areas 222. The controller 115 may be configured to activate an alarm 359 in response to this low friction area 222. The alarm 359 may be audible and/or visual. The alarm 359 may emanate from the computing device 300. The computing device 300 may include an alert device 357 configured to activate the alarm 359. In three non-limiting examples, the alert device 357 may be a vibration motor, audio speaker, and/or display screen.

The controller 115 may be configured to adjust operation of at least one of the motor brakes 137*a*, 137*b* and the guide rail brakes 138*a*, 138*b* in response to this low friction area 222. In one embodiment, the controller 115 is configured to activate the motor brakes 137*a*, 137*b* when the wheels 134*a*, 134*b*, 134*c*, 134*d* are at or proximate the low friction area 222. In one embodiment, the controller 115 is configured to pulsate the motor brakes 137*a*, 137*b* when the wheels 134*a*, 134*b*, 134*c*, 134*d* are at or proximate the low friction area 222. In one embodiment, the controller 115 is configured to activate the guide rail brakes 138*a*, 138*b* when the wheels 134*a*, 134*b*, 134*c*, 134*d* are at or proximate the low friction area 222. In one embodiment, the controller 115 is configured to pulsate the guide rail brakes 138*a*, 138*b* when the wheels 134*a*, 134*b*, 134*c*, 134*d* are at or proximate the low friction area 222.

The controller 115 may be configured to adjust operation of the compression mechanisms 150*a*, 150*b* in response to this low friction area 222. In one embodiment, the controller 115 is configured to increase compression of the compression mechanisms 150*a*, 150*b* when the wheels 134*a*, 134*b*, 134*c*, 134*d* are at or proximate the low friction area. By increasing compression of the compression mechanisms 150, 150*b*, the normal forces $F_n$ of the wheels 134*a*, 134*b*, 134*c*, 134*d* on the guide beams 111*a*, 111*b* are increased.

The controller 115 may be configured to adjust operation of the overall elevator system 101 in response to the amount of slippage and loss of friction in the low friction area 222. For example, if the coefficient of friction of the guide beam 111*a*, 111*b* has decreased below a selected coefficient of friction for safe operation of the elevator system 101, the controller 115 may shut-down the elevator system 101 until it is inspected (e.g., by a mechanic, or inspection machine) or command the elevator car 103 to only serve landings 125 above or below the low friction area 222, thus preventing the elevator car 103 from passing through the low friction area 222.

Additionally, the slippage of one of the wheels 134*a*, 134*b*, 134*c*, 134*d* may be detected by comparing a detected speed of the elevator car 103 or the beam climber system 130 to an expected speed of the elevator car 103 or the beam climber system 130. A difference greater than a selected speed tolerance between the detected speed of the elevator car 103 or the beam climber system 130 to the expected speed of the elevator car 103 or the beam climber system 130 may indicate a low friction area 222. The speed of the elevator car 103 or the beam climber system 130 may be detected by the accelerometer 107 (see FIG. 1). The speed of the elevator car 103 or the beam climber system 130 may also be detected by tracking the location of the elevator car 103 or the beam climber system 130 over a period of time using the position reference system 113.

Figure 3:
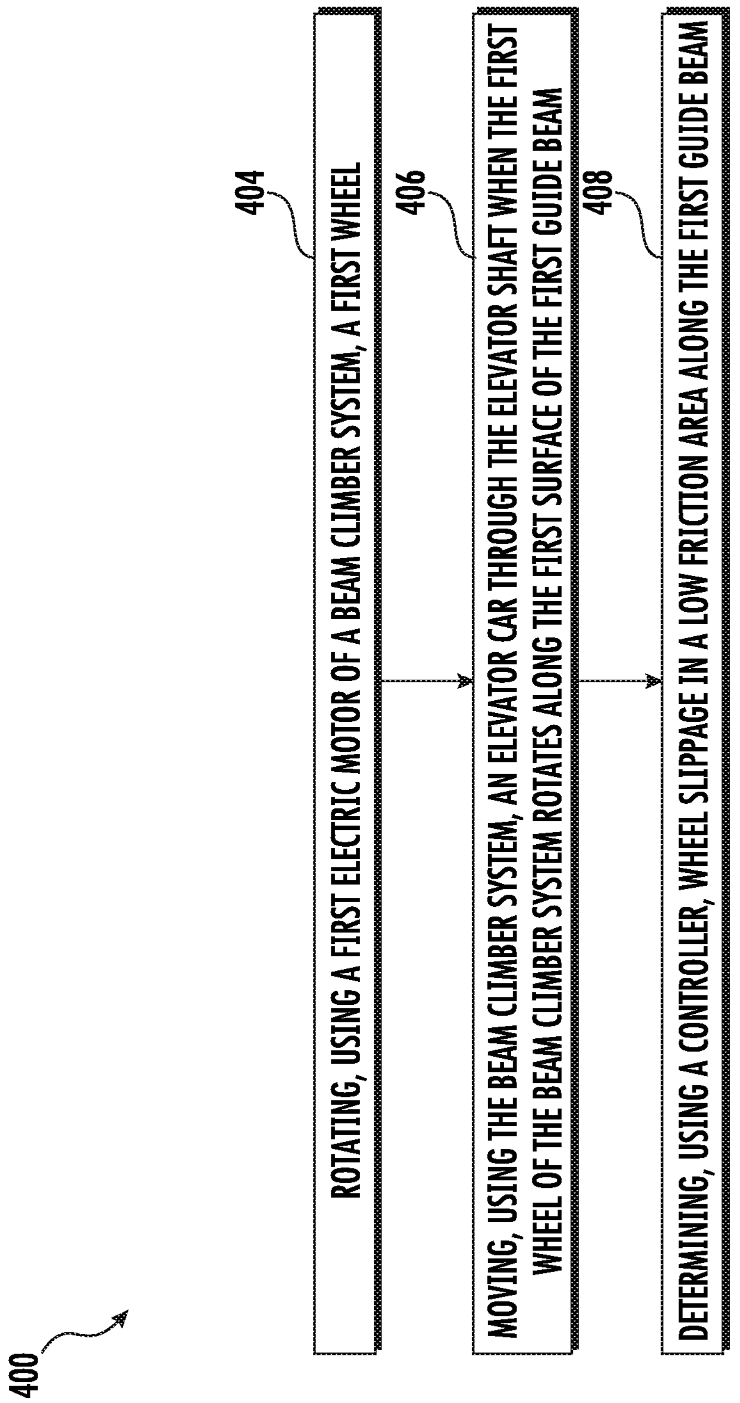
FIG. 3 is a flow chart of method of operating an elevator system, in accordance with an embodiment of the disclosure.

Referring now to FIG. 3, with continued reference to FIGS. 1-2, a flow chart of method 400 of operating an elevator systems 101 is illustrated, in accordance with an embodiment of the disclosure.

At block 404, a first wheel 134*a* is rotated using a first electric motor 132*a* of the beam climber system 130. The first wheel 134*a* being in contact with a first surface 112*a* of a first guide beam 111*a* that extends vertically through the elevator shaft 117. A compression mechanism 150*a* compresses the first wheel 134*a* against the first surface 112*a* of the first guide beam 111*a*.

At block 406, an elevator car 103 is moved through the elevator shaft 117, using the beam climber system 130, when the first wheel 134*a* of the beam climber system 130 130 rotates along the first surface 112*a* of the first guide beam 111*a*.

At block 408, wheel slippage in a low friction area 222 along the first guide beam 111*a* is determined using a controller 115. An alarm 359 may be activated on a computing device 300 when the wheel slippage is detected to notify a mechanic of wheel slippage The method 400 may further comprise that a sensor 210 detects a rotational wheel speed $N_W$ of the first wheel 134*a*. The controller 115 is configured to determine wheel slippage when the rotational wheel speed $N_W$ is outside of a rotational wheel speed tolerance range. Alternatively, the controller 115 may be configured to determine wheel slippage by comparing the rotational wheel speed $N_W$ of the first wheel 134*a* to the rotational wheel speed $N_w$ of another wheel.

The method 400 may also comprise that an accelerometer 107 detects a speed of the elevator car 103 or the beam climber system 130. The controller 115 is configured to determine wheel slippage when the speed is greater than an expected speed.

The method 400 may further comprise that a sensor 210 detects a torque of the first electric motor 132*a*. The controller 115 is configured to determine wheel slippage when the torque is outside of a torque tolerance range. Alternatively, the controller 115 may be configured to determine wheel slippage by comparing the torque of the first electric motor 132 to the torque of another electric motor.

The controller 115 is configured to determine wheel slippage when the rotational wheel speed $N_W$ is outside of a rotational wheel speed tolerance range and the torque is outside of a torque tolerance range.

The method 400 may yet further comprise that a position reference system 113 detects a location of the elevator car 103 when the wheel slippage is detected.

The method 400 may yet further comprise that a controller 115 activates and/or pulsates a first motor brake 137*a* when the first wheel 134*a* is at or proximate the low friction area 222. The first motor brake 137*a* being mechanically connected to the first electric motor 132*a*.

The method 400 may yet further comprise that a controller 115 activates and/or pulsates a guide rail brake 138*a* when the first wheel 134*a* is at or proximate the low friction area 222, the first guide rail brake 138*a* being operably connected to a first guide rail 109*a* that extends vertically through the elevator shaft 117.

While the above description has described the flow process of FIG. 3 in a particular order, it should be appreciated that unless otherwise specifically required in the attached claims that the ordering of the steps may be varied.

The present invention may be a system, a method, and/or a computer program product at any possible technical detail level of integration. The computer program product may include a computer readable storage medium (or media) having computer readable program instructions thereon for causing a processor to carry out aspects of the present invention.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:

an elevator car configured to travel through an elevator shaft;

a first guide beam extending vertically through the elevator shaft, the first guide beam comprising a first surface and a second surface opposite the first surface;

a beam climber system configured to move the elevator car through the elevator shaft, the beam climber system comprising:

a first wheel in contact with the first surface; and a first electric motor configured to rotate the first wheel; and a controller configured to determine wheel slippage in a low friction area along the first guide beam;

a sensor configured to detect a rotational wheel speed of the first wheel, wherein the controller is configured to determine wheel slippage in response to the rotational wheel speed is outside of a rotational wheel speed tolerance range;

a position reference system configured to detect a location of the elevator car in response to detection of wheel slippage.

2. The elevator system of claim 1, further comprising:

an accelerometer configured to detect a speed of the elevator car or the beam climber system, wherein the controller is configured to determine wheel slippage when the speed is greater than an expected speed.

3. The elevator system of claim 1, further comprising:

a sensor configured to detect a torque of the first electric motor, wherein the controller is configured to determine wheel slippage when the torque is outside of a torque tolerance range.

4. The elevator system of claim 1, further comprising:

a sensor configured to detect a rotational wheel speed of the first wheel; and a sensor configured to detect a torque of the first electric motor, wherein the controller is configured to determine wheel slippage when the rotational wheel speed is outside of a rotational wheel speed tolerance range and the torque is outside of a torque tolerance range.

5. The elevator system of claim 1, further comprising:

a first motor brake mechanically connected to the first electric motor, wherein the controller is configured to activate the first motor brake when the first wheel is at or proximate the low friction area.

6. The elevator system of claim 5, wherein the controller is configured to pulsate the first motor brake when the first wheel is at or proximate the low friction area.

7. The elevator system of claim 1, further comprising;

a first guide rail extending vertically through the elevator shaft; and a first guide rail brake operably connected to the first guide rail, wherein the controller is configured to activate the first guide rail brake when the first wheel is at or proximate the low friction area.

8. The elevator system of claim 1, further comprising;

a first guide rail extending vertically through the elevator shaft; and a first guide rail brake operably connected to the first guide rail, wherein the controller is configured to pulsate the first guide rail brake when the first wheel is at or proximate the low friction area.

9. The elevator system of claim 1, further comprising;

a compression mechanism, configured to compress the first wheel against the first surface of the guide beam.

10. The elevator system of claim 9, wherein the controller is configured to increase compression of the first wheel against the first surface of the guide beam when the first wheel is at or proximate the low friction area.

11. A method of operating an elevator system, the method comprising:

rotating, using a first electric motor of a beam climber system, a first wheel, the first wheel being in contact with a first surface of a first guide beam that extends vertically through an elevator shaft;

moving, using the beam climber system, an elevator car through the elevator shaft when the first wheel of the beam climber system rotates along the first surface of the first guide beam; and determining, using a controller, wheel slippage in a low friction area along the first guide beam;

detecting, using a sensor, a rotational wheel speed of the first wheel, wherein the controller is configured to determine wheel slippage in response to the rotational wheel speed being outside of a rotational wheel speed tolerance range;

detecting, using a position reference system, a location of the elevator car in response to detection of wheel slippage.

12. The method of claim 11, further comprising:

detecting, using an accelerometer, a speed of the elevator car or the beam climber system, wherein the controller is configured to determine wheel slippage when the speed is greater than an expected speed.

13. The method of claim 11, further comprising:

detecting, using a sensor, a torque of the first electric motor, wherein the controller is configured to determine wheel slippage when the torque is outside of a torque tolerance range.

14. The method of claim 11, further comprising:
detecting, using a sensor, a rotational wheel speed of the first wheel; and
detecting, using a sensor, a torque of the first electric motor,
wherein the controller is configured to determine wheel slippage when the rotational wheel speed is outside of a rotational wheel speed tolerance range and the torque is outside of a torque tolerance range.

15. The method of claim 11, further comprising:
activating, using the controller, a first motor brake when the first wheel is at or proximate the low friction area, the first motor brake being mechanically connected to the first electric motor.

16. The method of claim 11, further comprising:
activating, using the controller, a first guide rail brake when the first wheel is at or proximate the low friction area, the first guide rail brake being operably connected to a first guide rail that extends vertically through the elevator shaft.

17. The method of claim 11, further comprising:
compressing, using a compression mechanism, the first wheel against the first surface of the first guide beam.

* * * * *